UNITED STATES PATENT OFFICE 2,260,665

GUANIDINE THIOSULPHATE REACTION PRODUCT

Garnet Philip Ham, Old Greenwich, Conn., assignor to American Cyanamid Company, New York, N. Y., a corporation of Maine No Drawing. Application May 20, 1941, Serial No. 394,371

6 Claims. (Cl. 95—88)

This invention relates to a photographic fixing composition and more particularly to a photographic acid hardener and fixing bath.

The standard fixing bath for silver halide sensitized material depends on the solvent action of sodium thiosulphate on the silver halide. Such fixing baths usually contain in addition to the sodium thiosulphate, some sodium sulphite and sufficient acid to give the bath the desired pH. Potassium aluminum sulphate or some other alum, such as chrome alum, is generally included to give the bath the desired hardening action.

As stated in U. S. Patent No. 2,174,494 to Robert Bowling Barnes, the fixing baths of this type are subject to the disadvantage that the speed is only moderate and that the baths become quickly exhausted when the amount of silver dissolved is only a few percent of that corresponding to the sodium thiosulphate in the bath. The Barnes patent discloses that the addition of an amidine salt and more particularly the addition of a guanidine salt results in an improved speed and capacity for the solution of silver by the bath. The present invention is an improvement on the discovery of Barnes, however, the bath addition agent which forms the subject matter of this invention is also of great utility apart from the amidine salts of the Barnes invention and this invention should in no way be construed as limited to an improvement thereon.

According to the present invention the fixing solution contains in addition to sodium thiosulphate and the other normal ingredients of a fixing and hardening bath, an amount of the oxidation product of guanidine thiosulphate sufficient to be effective to bring about an improvement in the fixing speed. Preferably, the guanidine thiosulphate oxidation product is used in a photographic fixing and hardening bath which already contains an amidine salt, such as a guanidine salt. As previously stated, however, the guanidine thiosulphate oxidation product is of utility in photographic fixing and hardening baths of the normal type which do not contain an amidine salt.

The guanidine thiosulphate oxidation product may be produced, for example, by the oxidation of guanidine thiosulphate ($2H_2O$) by means of an alcoholic solution of iodine at room temperature and at atmospheric pressure. The following example is illustrative of a procedure suitable for making the oxidation product of guanidine thiosulphate.

EXAMPLE I

A concentrated aqueous solution of guanidine thiosulphate, containing 78 grams of guanidine thiosulphate, was filtered and then slowly added to an alcoholic solution containing 32 grams of iodine. The mixture was agitated and the reaction allowed to proceed at room temperature and at atmospheric pressure. The course of the reaction could be observed by noting the characteristic color changes of the reaction mixture, i. e., brown, red-brown, yellow to white. When the reaction was completed a yellowish white precipitate was formed, which after sufficient time, because of its density settled to the bottom of the reaction vessel. The precipitate was then filtered to separate it from the alcoholic solution, and redissolved in water. The guanidine thiosulphate oxidation product was then reprecipitated from the aqueous solution by the addition thereto of 95% ethyl alcohol and the precipitate dried in vacuo.

The following examples illustrate the method of carrying out my invention and of using the new oxidation product.

EXAMPLE II

To 25 ml. of an acid hardener and fixer concentrated syrup diluted to 100 ml. with water and containing approximately 13 grams of sodium thiosulphate ($5H_2O$) and 2.7 grams of guanidine nitrate, 1.2 grams of my new oxidation product were added and dissolved. This solution at 24° C. was used as the fixing bath for a 5″ x 7″ Eastman orthoportrait film and the film cleared in 1 minute and 50 seconds as compared with film treated with a similar fixing bath without my new oxidation product which showed a clearing time of 2 minutes and 30 seconds. The time required for complete clearing using solutions containing varying amounts of guanidine thiosulphate oxidation product were measured and the results are shown in the following table:

| Fixing syrup used | Water for dilution | $Na_2S_2O_3.5H_2O$ in syrup | Guanidine nitrate in solution | Oxidation product added | Fixing time at 24° C. |
|---|---|---|---|---|---|
| Milliliters | Milliliters | Grams | Grams | Grams | Min. Sec. |
| 25 | 75 | 13.0 | 2.7 | | 2  30 |
| 25 | 75 | 13.0 | 2.7 | 0.6 | 2  2 |
| 25 | 75 | 13.0 | 2.7 | 1.2 | 1  50 |
| 25 | 75 | 13.0 | 2.7 | 1.8 | 1  50 |

The acid hardener and fixer syrup was prepared as follows:

Solution A

| | | |
|---|---|---|
| Water (60° C.) | milliliters | 700 |
| Urea | grams | 36 |
| Sodium sulphite, anh | do | 30 |
| Sodium thiosulphate (5H$_2$O) | do | 1000 |
| Guanidine nitrate | do | 208 |

Solution B

| | | |
|---|---|---|
| Water (60° C.) | milliliters | 300 |
| Acetic acid (28%) | do | 200 |
| Boric acid | grams | 30 |
| Potassium aluminum sulphate | do | 60 |
| Sodium sulphite, anh | do | 32 |

The acid hardener and fixing syrup was formed by mixing Solutions A and B.

EXAMPLE III

An Eastman F5 acid hardener and fixing solution was prepared as follows:

| | | |
|---|---|---|
| Sodium thiosulphate (5H$_2$O) | grams | 240 |
| Sodium sulphite, anh | do | 15 |
| Acetic acid (28%) | milliliters | 48 |
| Boric acid | grams | 7.5 |
| Potassium aluminum sulphate | do | 15.0 |
| Water | milliliters | 1000 |

200 ml. of the above solution were used to fix a 5" x 7" Eastman orthoportrait film, and the film cleared completely in 3 minutes and 30 seconds. To another 200 ml. portion of the above solution was added 0.6 gram of the oxidation product. This solution when used to fix an orthoportrait film as above reduced the clearing time to 2 minutes and 30 seconds.

The improved result obtained is due to the presence of the oxidation product of the compound of guanidine and thiosulphate. In order to establish that this fact was true, tests were conducted to show that the improvement was not caused by a further increase in the guanidine ion content of the fixing bath, which ion was shown in U. S. Patent No. 2,174,494, referred to above, to decrease the fixing time. Also, tests were conducted to show that the improvement would not be brought about by the oxidation of any thiosulphate, but that it was the combination of guanidine with the thiosulphate which yielded a product possessing the properties desired.

To compare the effect of the guanidine thiosulphate oxidation product with other salts of guanidine which would yield guanidine ions, tests were run using a diluted fixing syrup solution containing sodium thiosulphate and guanidine nitrate as in Example I, the times required for complete clearing of a 5" x 7" Eastman orthoportrait film using increasing amounts of guanidine nitrate were measured. The results are tabulated in the following table:

| Fixing syrup used | Water for dilution | Na$_2$S$_2$O$_3$.5H$_2$O in syrup | Guanidine nitrate in solution | Guanidine nitrate addition | Total guanidine nitrate | Fixing time at 24° C. |
|---|---|---|---|---|---|---|
| Milliliters | Milliliters | Grams | Grams | Grams | Grams | Min. Sec. |
| 25 | 75 | [1] 13.0 | [1] 2.7 | | 2.7 | 2  30 |
| 25 | 75 | [1] 13.0 | [1] 2.7 | 0.6 | 3.3 | 2  20 |
| 25 | 75 | [1] 13.0 | [1] 2.7 | [2] 1.2 | 3.9 | 2  20 |
| 25 | 75 | [1] 13.0 | [1] 2.7 | [2] 1.8 | 4.5 | 2  20 |

[1] Approximately.
[2] Total.

By a comparison between the above table and the table given in Example I, is can be seen that after the guanidine ion reaches a certain concentration, further increase produces practically no increase in the fixing speed. The new guanidine thiosulphate oxidation product, on the contrary, will bring about a still further reduction in the fixing time.

To compare the effect of replacing the guanidine radical with some other radical in the compounds, sodium thiosulphate was oxidized in the same manner as the guanidine thiosulphate. The resultant product, when added to photographic fixing and hardening baths, either with or without amidine salts, acted as a depressant rather than an accelerator of the fixing speed. For example, when used in a fixing solution containing 13 grams of sodium thiosulphate and 2.7 grams of guanidine nitrate in 100 ml. of solution the addition of 0.6 gram of the sodium thiosulphate oxidation product increased the clearing time for a 5" x 7" Eastman orthoportrait film from 2 minutes and 30 second to 3 minutes and 10 seconds. In contrast to this, as can be seen by a comparison of the table given in Example I, the addition of 0.6 gram of my new guanidine thiosulphate oxidation product to a similar acid hardening and fixing bath reduced the clearing time to 2 minutes.

From the foregoing examples and description of my invention, it can be seen that the guanidine thiosulphate oxidation product, when added to a photographic hardening and fixing bath produces a decrease in the time required for fixing silver halide sensitized material and this decrease is distinct from the improvement in the fixing speed obtained by the mere addition of guandine ions since the improvement may be obtained beyond the point where the addition of further guanidine ions will produce an appreciable increase in the fixing speed. I have also shown that the oxidation product of any thiosulphate will not produce my improved result, but that it is the oxidation product of the compound of guanidine with the thiosulphate radical which gives the desired increase in fixing speed.

Having described my invention and the manner of carrying it out, what I claim is:

1. A silver halide photographic fixing agent of the thiosulphate type containing guanidine thiosulphate oxidation product in amounts effective to increase the fixing speed.

2. A silver halide photographic fixing agent of the thiosulphate type containing an amidine salt and guanidine thiosulphate oxidation product in amounts effective to increase the fixing speed.

3. A silver halide photographic fixing agent of the thiosulphate type containing a guanidine salt and guanidine thiosulphate oxidation product in amounts effective to increase the fixing speed.

4. An acid silver halide fixing and hardening agent of the thiosulphate type containing a hardening agent and guanidine thiosulphate oxidation product in amounts effective to increase the fixing speed.

5. An acid silver halide photographic fixing and hardening agent of the thiosulphate type containing a hardening agent, an amidine salt, and guanidine thiosulphate oxidation product in amounts effective to increase the fixing speed.

6. An acid silver halide photographic fixing and hardening agent of the thiosulphate type containing a hardening agent, a guanidine salt, and guanidine thiosulphate oxidation product in amounts effective to increase the fixing speed.

GARNET PHILIP HAM.